United States Patent
Burmester et al.

(10) Patent No.: US 8,622,076 B2
(45) Date of Patent: Jan. 7, 2014

(54) SEAT CLEANING-CAPABLE DOUBLE-SEAT VALVE

(75) Inventors: Jens Burmester, Grambek (DE); Matthias Suedel, Ratekau (DE)

(73) Assignee: GEA Tuchenhagen GmbH, Buechen (DE)

( * ) Notice: Subject to any disclaimer, the term of this patent is extended or adjusted under 35 U.S.C. 154(b) by 527 days.

(21) Appl. No.: 12/863,004

(22) PCT Filed: Jan. 7, 2009

(86) PCT No.: PCT/EP2009/000041
§ 371 (c)(1),
(2), (4) Date: Jan. 17, 2011

(87) PCT Pub. No.: WO2009/090005
PCT Pub. Date: Jul. 23, 2009

(65) Prior Publication Data
US 2011/0100492 A1    May 5, 2011

(30) Foreign Application Priority Data
Jan. 16, 2008   (DE) .......................... 10 2008 004 597

(51) Int. Cl.
*F16K 1/44*     (2006.01)
*F16K 25/00*    (2006.01)

(52) U.S. Cl.
USPC ...................... 137/240; 137/614.18; 137/556

(58) Field of Classification Search
USPC ............... 137/240, 238, 614.16–614.18, 556, 137/553, 554, 312
See application file for complete search history.

(56) References Cited

U.S. PATENT DOCUMENTS 5,771,926 A * 6/1998 Medal et al. ................... 137/554
7,845,368 B2 * 12/2010 Burmester et al. ....... 137/614.18

FOREIGN PATENT DOCUMENTS

| DE | 3835944 A1    | 4/1990 |
| DE | 196 18 235 C1 | 6/1997 |
| DE | 196 08 792 A1 | 9/1997 |
| DE | 198 42 603 A1 | 4/2000 |
| EP | 0 545 846 A1  | 6/1993 |
| EP | 0 646 741 A1  | 9/1996 |
| WO | 2007/054131 A1| 5/2007 |

* cited by examiner

*Primary Examiner* — Kevin Lee
(74) *Attorney, Agent, or Firm* — Vidas, Arrett & Steinkraus, P.A.

(57) ABSTRACT

The invention relates to a seat cleaning-capable double-seat valve (1) with two serially arranged closing elements (3, 4), moveable relative to each other and designed as slide pistons, which border both in the closed and open position of the double seat valve (1) a leakage cavity (9), which is connected with the surroundings of the double-seat valve (1) via a tubular shaft (4b/4c) arranged on a low-lying (with respect to a vertical normal position of the double-seat valve (1)), second closing element (4), in which a drainage hole (4d) is arranged. The second, independently driven closing element (4) is thereby designed larger than the first, independently driven closing element (3) so that, as a result, the double-seat valve (1) opens downward and the drainage of the leakage cavity (9) also takes place downward.

22 Claims, 6 Drawing Sheets

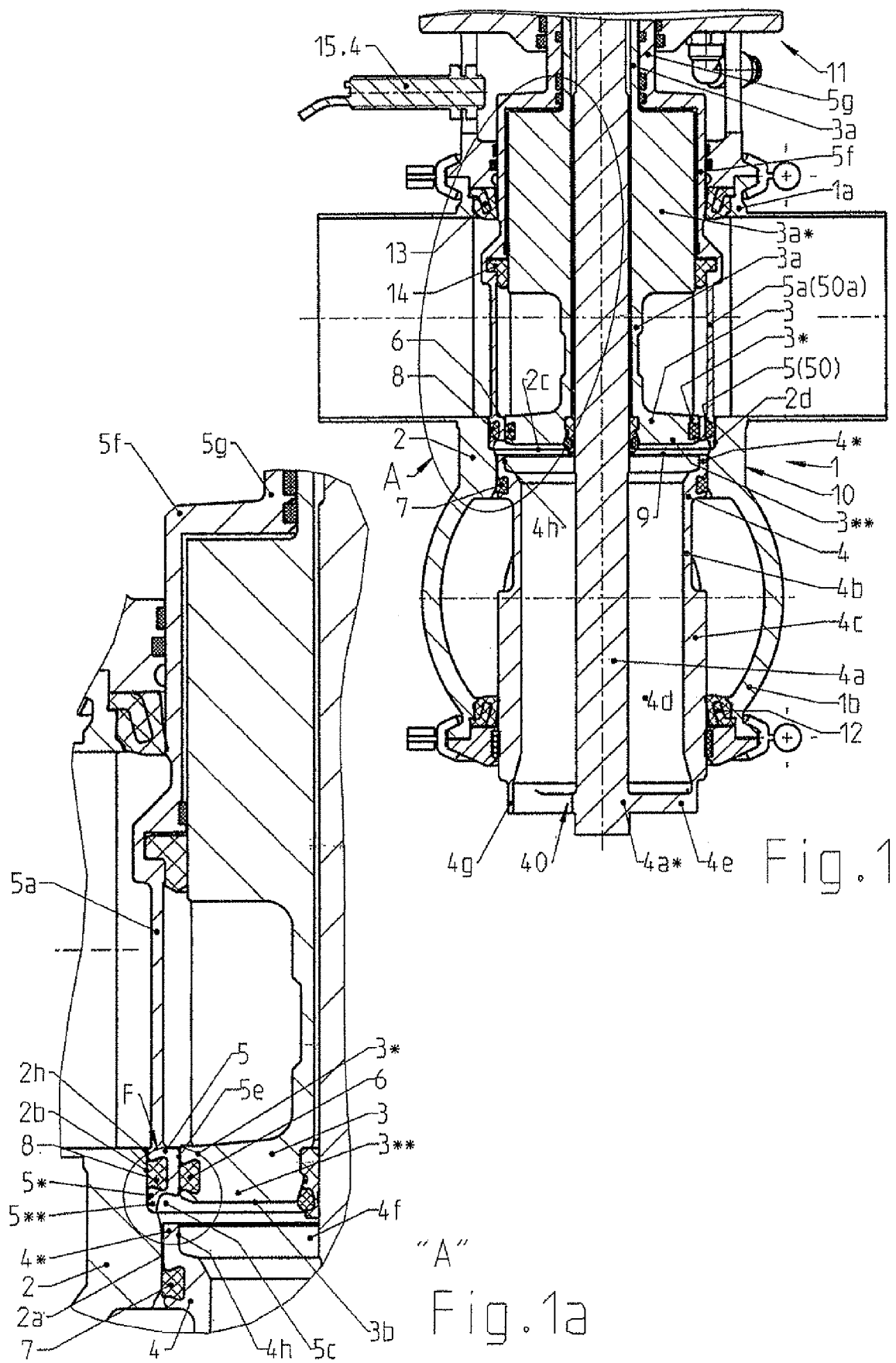

"B"

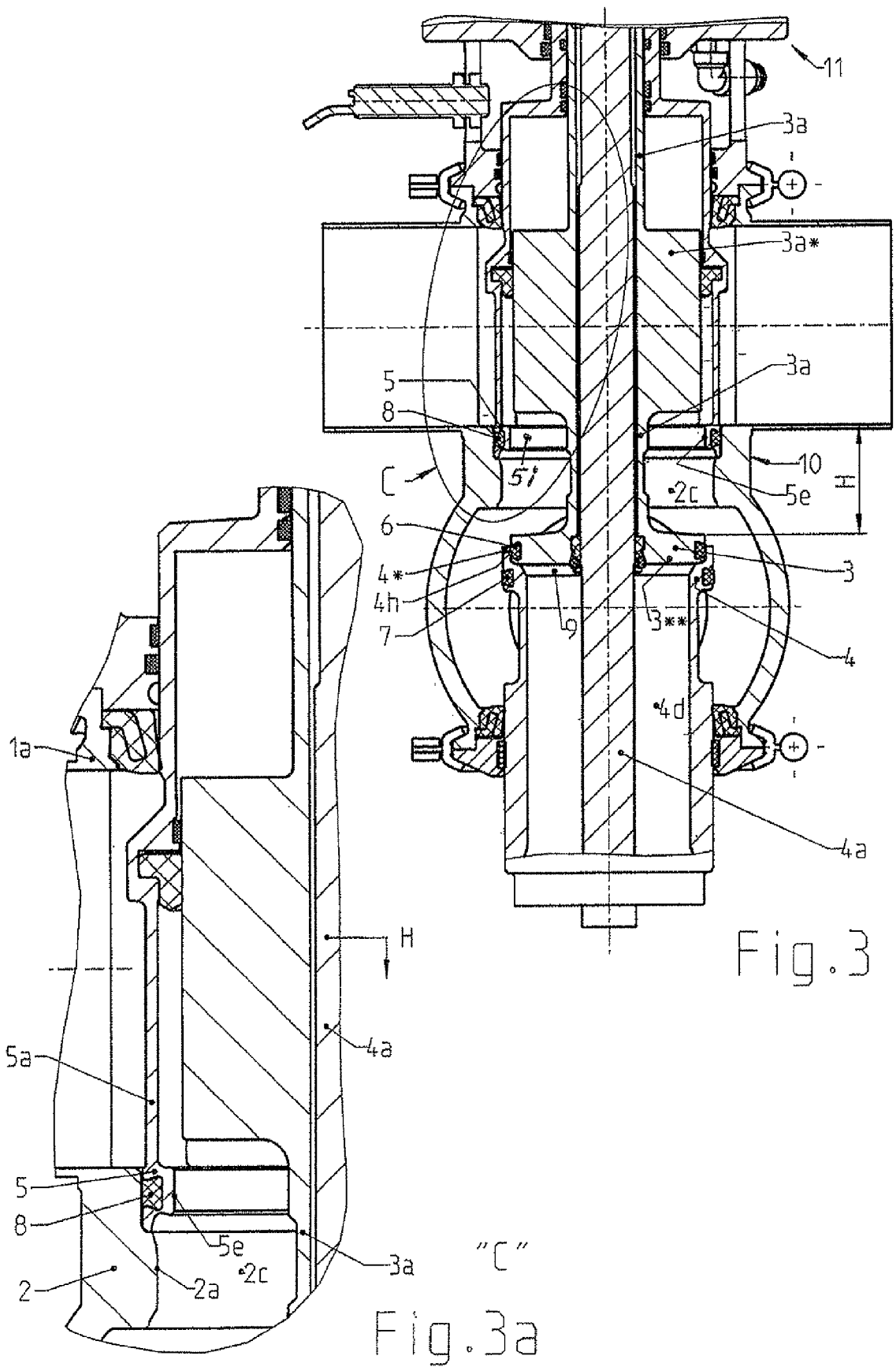

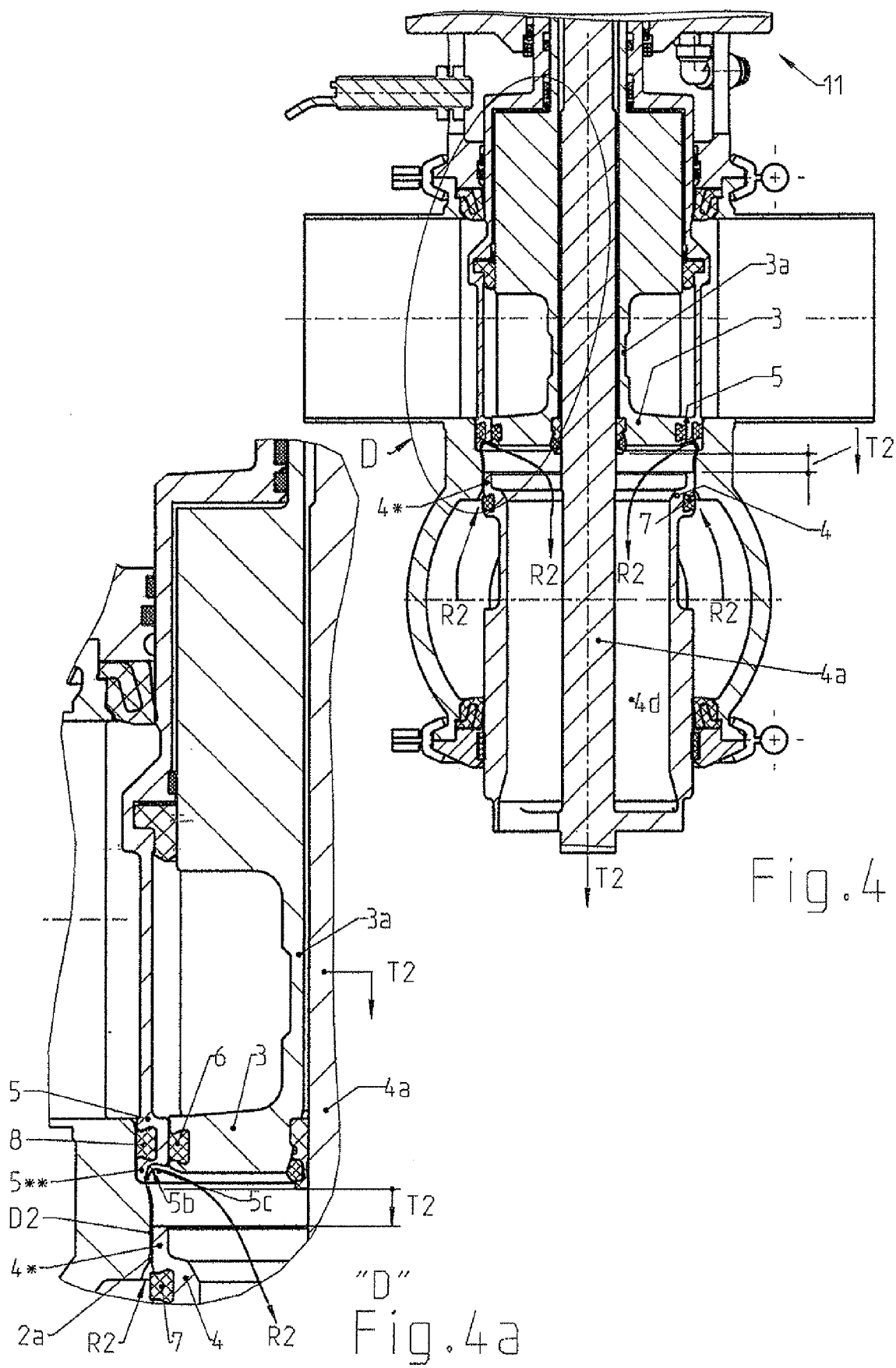

"E" Fig.5a

SEAT CLEANING-CAPABLE DOUBLE-SEAT VALVE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a seat cleaning-capable double-seat valve with two serially arranged closing elements, moveable relative to each other and designed as slide pistons, which prevent in the closed position of the double-seat valve the overflow of fluids from one valve housing part into another through a connecting opening connecting the valve housing parts with each other and which border both in the closed and open position a leakage cavity, which is connected with the surroundings of the double-seat valve via a tubular shaft arranged on the low-lying (in relation to a vertical normal position of the double-seat valve), second closing element, in which a drainage hole is arranged. The second, independently driven closing element is thereby designed larger than the first, independently driven closing element so that, as a result, the double-seat valve opens downward and the drainage of the leakage cavity also takes place downward. The closing elements are actuated via valve rods, both of which are led upward out of a valve housing and into a drive.

A so-called leakage-free switching double-valve arrangement, which has important characteristics of the initially described seat cleaning-capable double-seat valve, is known from EP 0 646 741 A1. This known double-seat valve has two closing elements designed as slide pistons. It opens, in relation to a vertical normal position, downward and the drainage of the leakage cavity also takes place downward, and namely via a tubular shaft formed on the lower-lying closing element, in which a drainage hole is arranged and which is led downward out of the valve housing. The two closing elements are each transferable to a rinse position independently of each other through a partial lift arranged opposite the opening movement, in which the respective closing element is free of its valve seating and is adjacent to a housing stop provided with rinsing agent passages. The rinsing agent passages thereby restrict the cleaning agent quantity during the respective seat cleaning. The closing elements are actuated via valve rods, which both lead upward out of a valve housing and into a drive. In order to enable the removability of the overhead, smaller and the low-lying, larger closing element in one upwards movement, the valve seats are provided with sealing rings, which are held by housing inserts. These housing inserts are inserted into the valve housing from the side lying opposite the tubular shaft.

In the case of the known double-seat valve according to EP 0 646 741 A1, it is advantageous, like with all other double-seat valves that open downward and have a leakage drain led downward out of the valve housing, that in the open position of the double-seat valve the passage cross-section of a connecting opening connecting the two valve housing parts is not constricted by the cross-section of the leakage drain. This then reduces in particular the nominal width of the valve housing determined by the passage cross-section of the connecting opening by one to two nominal widths when, as required in the USA, the passage cross-section of the leakage drain between the leakage cavity and the surroundings of the double-seat valve must be the same as the largest passage cross-section of the pipeline connected to the double-seat valve.

In the case of the known double-seat valve according to EP 0 646 741 A1, it is disadvantageous that it is at best leakage-resistant and not, as the title claims, leakage-free. The switch leakage results from the fact that in the case of each opening or closing lift in the space, which is bordered on the valve housing side on one side between the two seat seals and on the closing element side on the other side, liquid is locked in and that this liquid gets into the leakage cavity and from there into the leakage drain after separation of the two closing elements on the center seal operating between both. It is also disadvantageous that the respective seat cleaning flow, which makes its way through the rinsing agent passages at the associated housing stop and is primarily oriented axially/radially, pressurizes in a more or less uncontrolled and turbulent manner the seat seal located in the closed position.

With the known double-seat valve according to EP 0 646 741 A1, the cleaning agent quantity during the respective seat cleaning can be limited, as desired. The requirements set in certain countries for such a double-seat valve are however more comprehensive. For example, it is required in the USA that no cleaning agent can pass through in the case of larger seal defects or even the failure of one of the two seat seals in the course of the seat cleaning of the other closing element. Under these conditions, it is not only required of these types of double-seat valves that they restrict the cleaning agent quantity and avoid a direct pressurization of the seat areas during the seat cleaning, but also that they remove the seat cleaning flow in the most turbulence-free manner possible first in the leakage cavity and from there into the surroundings without the respectively closed seat area being directly impacted by this seat cleaning flow or being pressurized such that pressure is increased.

Direct impact is understood to be every speed component of the respective seat cleaning flow, directed orthogonally onto the walls delimiting the seat. It has been shown that any such direct impact leads to a conversion of the kinetic flow energy into static pressure. Depending on the angle of impact of the flow against the wall or body surface, a branching of the flow results in a so-called "branching flow line", wherein the latter divides the flow into two halves. The branching flow line itself runs up against the so-called "stagnation point", such that the speed at this location is zero. The pressure increase as a result of this stoppage of the speed is also called "dynamic pressure". The mechanisms increasing the pressure, described above, generate a leakage flow across the respective gap between the closing element in the assigned seat, and the seat seal that is defective or no longer present at all. Therefore, a direct impact of the seat cleaning flow on the surface delimiting the leakage cavity is always counterproductive.

A double-seat valve opening upward, in relation to a vertical normal position, which allows a cleaning of the respective released seat due to its function, also called a seat cleaning-capable double-seat valve, is known from DE 196 08 792 C2. In the case of this double-seat valve, the cleaning agent quantity for the respective seat cleaning can be controlled by so-called choke gaps and measured very closely. Moreover, a direct pressurization of the respectively closed seat in the course of the seat cleaning of the other seat is prevented through guidance and steering of the seat cleaning flows.

The seat cleaning-capable double-seat valve according to DE 196 08 792 C2 has two so-called seat cleaning positions, wherein the first seat cleaning position is generated by a first partial lift directed opposite the opening lift. In this position, the cylindrical appendage arranged on the leakage-space-side on the first closing element with the associated cylindrical first seat forms a so-called choke gap, via which the cleaning agent quantity led out of the neighboring first valve housing part can be restricted. The seat cleaning position of the second closing element takes place through a second partial lift arranged similarly with respect to the opening lift, wherein in the partially open position the cylindrical appendage arranged on the leakage cavity side on the second closing element with the associated part of the connecting opening forms a second choke gap, which limits the quantity of the second seat cleaning flow generated in this seat cleaning position.

Since the two closing elements and the associated cylindrical appendages have different diameters, the respectively associated sections of the connecting opening are also different in diameter so that a transition surface materializes between these two diameters. In the case of the seat cleaning position of the first closing element, the first seat cleaning flow flows along the cylindrical seat and hits the front-side boundary at the second closing element, wherein at least a direct impact of the first seat cleaning flow on the second choke gap and thus the seat area of the second closing element is prevented by the diameter difference between the two sections of the connecting opening. In the case of the seat cleaning position of the second closing element, the second seat cleaning flow is deflected radially inward at the transition surface bridging the diameter difference between the sections of the connecting opening and bypasses the upper frontal periphery of the first closing element. Also in this case, an indirect impact of the second seat cleaning flow on the first choke gap and thus the seat area of the first closing element is thereby prevented.

A seat cleaning-capable double-seat valve, which is improved with respect to the state of the art described above among other things in that the most turbulence-free discharge of the seat-cleaning flow into and out of the leakage cavity is ensured and a pressure-increasing direct pressurization of the seat area is securely avoided, is known from WO 2007/054131 A1. This is achieved among other things through a transition surface between the two seats of the closing elements and an annular recess in the shape of a special deflection surface in the dependently driven, larger closing element. A center seal is arranged between the two closing elements so that this closing element configuration in the strict sense of the word is more of a leakage-resistant than a leakage-free switching.

A seat cleaning-capable double-seat valve, which is improved with respect to the state of the art described above according to WO 2007/054131 A1 through mainly leakage-free switching, is also known from WO 2007/054134 A1. This is achieved in that the dependently driven, larger closing element has a recess with a mainly cylindrical circumferential wall flush with the seat of the smaller closing element on the end facing the independently driven, smaller closing element, and the recess is dimensioned to receive in a sealing manner an end section and a radial seal of the smaller closing element during the opening movement before the larger closing element opens.

The object of the present invention is to achieve a leakage-free switching in a seat cleaning-capable, downward-opening double-seat valve and to avoid a pressure-increasing direct pressurization of the closed seat area during the respective seat cleaning as well as to ensure the most turbulence-free possible discharge of the seat cleaning flow into and out of the leakage cavity.

BRIEF SUMMARY OF THE INVENTION

In order to solve the object underlying the invention, the inventive fundamental idea is to equip the seat cleaning-capable double-seat valve with all those characteristics, which are all partially realized in the known double-seat valves briefly outlined above and which generate in total the following desirable properties and characteristics of a seat cleaning-capable double-seat valve, with respect to its vertical normal position:
  two series-connected closing elements designed as slide pistons, the respective seat seal of which works together with the associated, cylindrical seat radially, i.e. in so-called gliding engagement;
  leakage-free switching closing element design and kinematics;
  opening movement of the double-seat valve downward;
  drainage of the leakage cavity downward;
  actuation of the closing element through displacement rods, which are fed together upward out of the valve housing to a drive;
  upward removability of the two closing elements;
  avoidance of a pressure-increasing direct pressurization of the seat area located in the closed position for the respective seat cleaning;
  turbulence-free discharge of the seat cleaning flow into and out of the leakage cavity.
Moreover, according to an advantageous embodiment,
  a controlled restriction of the cleaning agent quantity is provided by the choke gap during the seat cleaning.

A first solution idea consists in that the seat cleaning flow discharged during the respective seat cleaning is fed in the most turbulence-free and hindrance-free manner into the leakage cavity and is discharged from there in the same manner into the surroundings. This occurs through a flow contour leading and guiding the seat cleaning flows in the leakage cavity in the form of a deflection surface, which is designed in the form of an annular recess in a preferred first embodiment of the suggested double-seat valve in a front side of the annular slide part facing the leakage cavity. This flow contour ensures in the case of the seat cleaning of the low-lying, second closing element that the second seat cleaning flow first follows in a break-free manner the wall progression in the area of the second seat. A shock-free deflection then takes place in the annular recess on the deflection surface provided there so that the latter can make its way into a drainage hole arranged centrically in the second closing element, without colliding in a dynamic-pressure-forming manner with the second closing element in the area of its areas surrounding the leakage cavity.

Another solution idea consists in that the axially relocatable, cylindrical annular slide part both in the closed as well as open position of the double-seat valve is received in a sealing manner radially outward in a cylindrical third seat, which is designed in a connecting opening connecting the valve housing parts together, and forms radially inward in a passage hole connected in a fluid-penetrable manner with the connecting opening a cylindrical first seat, which runs coaxially to the connecting opening.

It is furthermore provided according to the invention that the second seat has a diameter that is smaller than the diameter of the third seat associated with the slide part, wherein a transition surface is provided between the second and the third seat.

Moreover, it is achieved with the slide part, which can be removed from the top, that both closing elements can be removed from the top, although the overhead, first closing element is designed smaller in diameter than the low-lying, second closing element, wherein this diameter relation is a necessary prerequisite for the fact that the double-seat valve opens downward.

It is important for the flow guidance of the first and third seat cleaning flow generated through ventilation of the annular slide part that the third seat cleaning flow from the transition surface between the second and the third seat and the first seat cleaning flow from the exposed gap between the first closing element and the slide part is directed such that it makes its way turbulence-free into a draining bore hole in the tubular shaft of the second closing element.

Leakage-free switching of the double-seat valve is realized with another solution idea. It consists in that the first closing element has on a first end section a first seal, which seals radially in the first seat, wherein the second closing element has a recess with a mainly cylindrical circumferential wall flush with the first seat on its end facing the first closing element and the recess is dimensioned in order to receive in a sealing manner during the opening movement the first end section and the radial first seal of the first closing element before the second closing element opens.

For the controlled restriction of the cleaning agent quantity during the respective seat cleaning, an advantageous embodiment provides that a cylindrical first appendage is arranged facing away from the leakage cavity on the first closing element, which forms an annular first choke gap after execution of the first partial lift with the associated first seat. It is furthermore suggested that on the slide part on the side of the leakage cavity a cylindrical third appendage is arranged, which forms an annular third choke gap after execution of the first partial lift with the associated third seat. Another embodiment provides on the second closing element on the side of the leakage cavity a cylindrical second appendage, which forms an annular second choke gap after execution of the second partial lift with the associated second seat.

Since an axial separation is provided between the first and the second closing element in the closed position of the double-seat valve, it is moreover suggested for the optimization of the leakage-free switch process that the second closing element is fed with its front surface towards the slide part by a pickup lift directed opposite the opening movement and is installed there directly adjacent to the first seat.

In order to keep the second closing element as free as possible from the forces of the pressure of the fluid present in the second valve housing part, another suggestion provides that the tubular shaft in the area penetrating the associated second valve housing part is designed as a second pressure compensation piston, the outer diameter of which reaches up to the outer diameter of the second closing element in the borderline case.

According to another advantageous embodiment of the passage cross-section, the drainage hole designed in the tubular shaft is equal to the passage cross-section of the largest pipeline connected to the valve housing parts, whereby even the strictest measurement requirements, such as in the USA, are fulfilled.

In order to also drive the slide part via a drive actuating the closing element, another suggestion provides that the slide part is connected via fluid-penetrable connecting bars with a cup-shaped receiving cylinder open towards the slide part, which penetrates the associated first valve housing part in a relocatable and sealed manner and continues on its end facing away from the slide part in a third displacement rod designed as a hollow rod, which is inserted into the drive.

As further provided, the receiving cylinder described above is advantageously penetrated in a relocatable and concentric manner by a first displacement rod connected with the first closing element, designed as a hollow rod and inserted into the drive. At the inlet point into the receiving cylinder, the first displacement rod is sealed against it and it is designed as a first pressure compensation piston in the contact area with the receiving cylinder, the outer diameter of which reaches up to the outer diameter of the first closing element in the borderline case. The above arrangement permits the cleaning of the product-pressurized area of the receiving cylinder as well as those of the first displacement rod from within the first valve housing part in the flow.

It is also suggested in this connection that a second displacement rod connected with the second closing element penetrates concentrically the first displacement rod designed as a hollow rod and is inserted into the drive. It is thereby possible to actuate the two closing elements and the slide part with the single drive arranged on one side of the double-seat valve and preferably integrating all necessary adjustment devices.

The cleaning of the duct of the receiving cylinder through the associated valve housing part, the cleaning of the ring space formed between the receiving cylinder and the first pressure compensation piston and the cleaning of the ring space between the first and the second valve rod each in flow can take place through a cleaning agent, which is fed either from outside the double-seat valve or from the inside of the valve housing through measures to the ducts and a respectively suitable partial lift movement of the cylinder, piston or rods to be cleaned (see e.g. DE 38 35 944 C2). The discharge of the cleaning agent quantities necessary for the respective cleaning can either take place into the surroundings of the double-seat valve or via an inner discharge, en route via the leakage cavity. Accordingly suitable solutions are sufficiently known from the state of the art.

An advantageous embodiment of the slide part provides that, in its closed position with a stop surface arranged on its front face, it is adjacent to the transition surface and namely directly bordering the second seat such that in the further progression of the front side of the third appendage the annular second recess is provided, the contour of which, when seen from the meridian section, has a kink-free progression and begins radially outside with a first section of the rotation-symmetrical deflection surface (starting point of the contour) and discharges radially inside with a last section under a pointy third deflection angle into the cylindrical periphery of the first seat (opening point of the contour).

It is important that the shock-free deflection of the seat cleaning flow is in the deflection surface. According to the invention, this occurs in that, when seen from the meridian section, the deflection surface has a contour with a kink-free progression, wherein a directional vector in the opening point of the deflection surface under the aforementioned conditions points into the drainage hole arranged centrically in the second closing element. It is also important that the deflection surface and the stop surface form a second circumferential edge, which is directly adjacent to a first end section of the second seat in the closed position of the slide part.

It is also important that the stop surface under the named conditions is adjacent directly and fully circumferentially to the transition surface in the valve housing and if possible in the case of permanent or respectively metallic contact, is adjacently sealed on the leakage cavity. This requires a sufficiently centric guidance of the slide part in the valve housing and a sufficient centricity of all components of the double-seat valve participating in this guidance.

In order to avoid a direct pressurization of the seat area of the second closing element located in its closed position during the seat cleaning, it is also provided that a front-side restriction of the second closing element facing the leakage cavity has an axial safety distance from the directional vector at an outlet point of the transition surface designed as a first circumferential edge into the first end section.

In order to also counteract a chamfer of the slide part in the course of its closing movement, a second end section of the slide part has, according to an advantageous embodiment, radially outside subsequent to the stop surface an annular, circumferential chamfer, which runs against the stop surface at a cant angle, which is measured such that a third circumferential edge formed between the chamfer and a third diameter of the slide part formed through rounding, seen in the radial direction, is displaced outwards as far as possible and is fed as close as possible to the progression of the transition surface determined by the corner radius and there forms an annular, circumferential centering point.

In accordance with an advantageous embodiment, the safety distance of the second closing element from the directional vector at the outlet point of the transition surface into the first end section is measured such that it is at least as large as the sum of all manufacturing tolerances of the components of the double-seat valve, which in the closed position of the second closing element determine its smallest axial distance to the transition surface.

Another suggestion provides that a directional vector at the starting point of the contour of the deflection surface is flush with the first end section of the second seat. This preferred embodiment ensures a mainly shock-free inlet of the second sit cleaning flow into the deflection surface and thus into the recess in the slide part. The aforementioned condition must be met for a cylindrical first end section, which is flush with the cylindrical second seat, as well as for a conically expanding first end section (a so-called first opening slope), which is also provided within the framework of the invention. The conically expanding end section can thereby have exclusively bent or bent and straight contour elements.

Satisfactory results with respect to a shock-free deflection are also achieved according to another suggestion when a directional vector at the starting point of the contour of the deflection surface deviates from the directional vector of the first end section by a second deflection angle of less than 15 degrees, wherein in this respect a deviation is permissible in both directions. A larger second deflection angle in the clockwise direction leads to dynamic pressure formation and in the other direction to displacement and is thus counterproductive.

The first opening slope suggested according to the invention facilitates the entry of the second seal into the cylindrical second seat and thereby reduces the wear on this second seal. However, from a flow point of view, this opening slope is more of a disadvantage because it delays the second seat cleaning flow by increasing the flow cross-section and thus represents a displacement risk for the flow. It is suggested in this connection to represent the first end section forming the first opening slope by at least one conical shell surface. So that the first seat cleaning flow is not deflected on the contour of this conical shell surface, it is suggested to tilt the first end section by a pitch, which is designed between 0 and 15 degrees, preferably between 5 and 15 degrees and here most preferably 15 degrees.

It also proved to be beneficial with respect to an avoidance of any dynamic pressure formation when the first circumferential edge formed by the transition surface and the first end section is rounded with the smallest possible first corner rounding. In an ideal case, a sharp-edged model would be provided, which however is not permissible for reasons of stability and for production and technical reasons (endangering the second seal).

In accordance with another suggestion, the first seat in the valve housing with the transition surface forms a blunt or a perpendicular first deflection angle, wherein the perpendicular deflection angle (90 degrees) is preferred, since a secure, collision-free overflowing of the second closing element is hereby most ensured. The transition between the third seat and the transition surface is thereby rounded with a rounding radius.

In order to avoid dynamic pressure formation at the inlet of the second seat cleaning flow into the deflection surface in the slide part, another suggestion provides that the second circumferential edge formed by the stop surface and the deflection surface is rounded with the smallest possible second corning rounding. A sharp-edged transition in this area is not permitted for reasons of stability and for production and practical reasons. A relatively large rounding radius is counterproductive and leads to unwanted dynamic pressure formation.

In terms of an optimal flow guidance of the second seat cleaning flow, a contour of the deflection surface, which has a series of sections, has proven itself, wherein the first section, every other and the least section are each designed straight and wherein these sections are tangentially rounded with the largest possible deflection radii and are connected with each other.

A similarly satisfactory flow result is achieved according to another suggestion in that the contour is made up of a sequence of bent sections, each of which have a joint tangent at their respective transition points. Another embodiment provides that the contour is made up of a single section of continuously changed curves. Finally, it is also suggested that the contour is formed from a single section with a constant curve.

In order to avoid turbulence and dynamic pressure formation not only in the area of the seats of the double-seat valve described above, it is advantageous when all built-in components and hindrances in the remaining leakage cavity, if possible from a construction point of view, are avoided altogether. In this regard, another suggestion thus provides that the second displacement rod continues flying through the drainage hole and is permanently connected with the latter via at least one mainly radially oriented traverse at one end of the second closing element facing away from the first closing element. The otherwise conventional rods in the area of the leakage cavity and other connection means are thereby avoided and are relocated to an end located relatively far away from the leakage cavity, where they can no longer have disruptive impacts on the flow guidance.

The closed and open positions of the closing elements are, as suggested, detected via displacement rods actuating the latter by means of a first or respectively second position detector, which are arranged in a control head on the side of a drive facing away from the double-seat valve, and are generally reported back to a controller. The position detectors are preferably non-contact signaling devices, such as for example magnetoresistive sensors. The position detection for the second partial lift of the second closing element takes place in the same manner by means of a third position detector, while, according to another suggestion, the first partial lift of the slide part is captured via a fourth position detector, which detects the receiving cylinder connected with the slide part and led out of the first valve housing part and which is arranged between the first valve housing part and the drive.

A second underlying embodiment of the double-seat valve according to the invention differs from the preferred first embodiment in that the cylindrical annular slide part that is axially relocatable in two positions can be replaced by a fixed, cylindrical, annular, second seat ring. This second seat ring forms radially inside in a passage hole connected with the connecting opening in a fluid-permeable manner the cylindrical first seat already described for the first embodiment and it supports itself in an unrelocatable manner via at least one modified connecting bar in the first valve housing part, on its side lying opposite the second seat ring. The seat cleaning of the first closing element takes place in contract to the first embodiment in that the first closing element is conveyed to its seat cleaning position by a first partial lift arranged opposite the opening movement. The annular recess in the form of a deflection surface is now designed at the corresponding location in the part of the second seat ring abutting into the passage cross-section of the second seat.

The restriction of the cleaning agent quantity during the seat cleaning of the first closing element takes place in an advantageous embodiment via a cylindrical first appendage arranged on the leakage cavity side, which forms an annular first choke gap with the associated first seat.

The characteristics described in connection with the first embodiment are transferable to the second embodiment in an unrestricted manner inasmuch as these transfers advantageously design the second seat ring and the embodiment of the double-seat valve modified by this second seat ring and are technically feasible. The position detection with respect to the closed and open position of the valve as well as with respect to the second partial lift takes place in the same manner as in the first embodiment. Since the seat cleaning of the first element now performed via a first partial lift of the first closing element performed on it, the position detection for the first partial lift takes place via the first displacement rod by means of a fifth position detector, which is arranged in the control head.

BRIEF DESCRIPTION OF THE SEVERAL VIEWS OF THE DRAWINGS

A more detailed representation results from the following description and the attached figures of the drawing as well as the claims. While the invention is realized in the most varying embodiments, the drawing shows an exemplary embodiment of a preferred first embodiment of the suggested seat cleaning-capable double-seat valve and then describes according to construction and function under the prerequisite that this first embodiment only represents one example of the invention but does not restrict the invention to this specially shown example. An underlying second embodiment results from the claims and the description in connection with two modified components modified with respect to the underlying first embodiment, wherein only its reference numbers are entered in FIG. 1. The drawings show in:

FIG. 1 in a longitudinal and meridian section, the seat cleaning-capable double-seat valve according to the invention below its drive, wherein the double-seat valve is located in its closed position;

FIG. 1a in an enlarged representation, a longitudinal and meridian section in the seat area and the adjacent upper area according to a detail labeled with "A" in FIG. 1;

FIG. 3 in a longitudinal and meridian section, the seat cleaning-capable double-seat valve according to the invention according to FIG. 1, wherein the double-seat valve is located in its open position;

FIG. 3a in an enlarged representation, a longitudinal and meridian section in the seat area and the adjacent upper area according to a detail labeled with "C" in FIG. 3.

FIG. 4 in a longitudinal and meridian section, the seat cleaning-capable double-seat valve according to FIG. 1, wherein the double-seat valve is located in its seat cleaning position for the low-lying, second closing element;

FIG. 4a in an enlarged representation, a longitudinal and meridian section in the seat area and the adjacent upper area in accordance with a detail labeled with "D" in FIG. 4.

DETAILED DESCRIPTION OF THE INVENTION

Figure 1B:
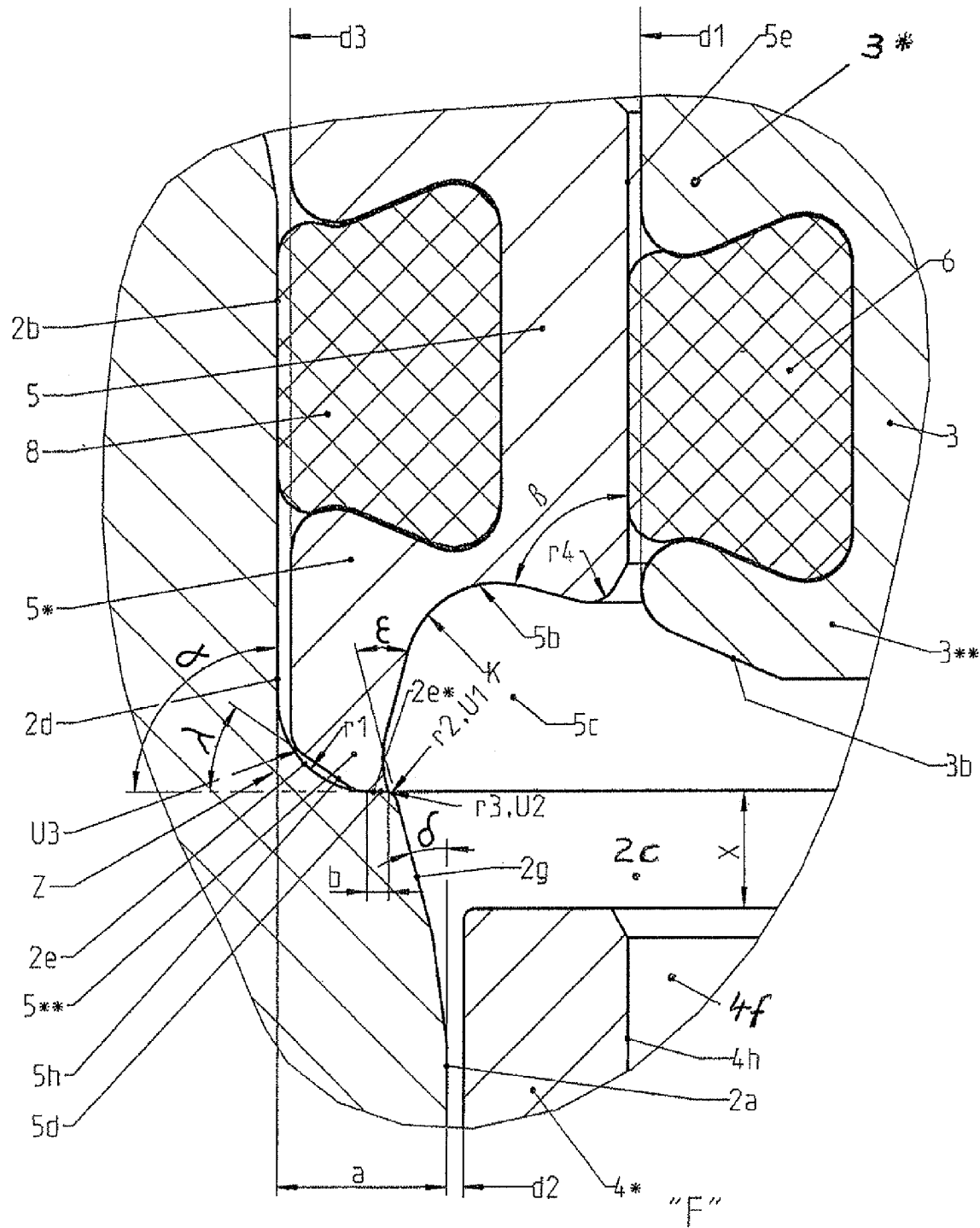
FIG. 1b in an enlarged representation, a detail labeled with "F" in FIG. 1a in the area of the annular second recess and the adjacent areas.

While this invention may be embodied in many different forms, there are described in detail herein a specific preferred embodiment of the invention. This description is an exemplification of the principles of the invention and is not intended to limit the invention to the particular embodiment illustrated.

The double-seat valve 1 (FIGS. 1, 1a, 1b) according to the invention in an underlying first embodiment consists mainly of a valve housing 10 with a first valve housing 1a arranged on the top side, with respect to its vertical normal position, and a second valve housing 1b arranged below it, two independently movable closing elements 3 and 4 with the respectively arranged displacement rods 3a or respectively 4a and a first seat ring 2, which establishes a connection between the valve housing parts 1a, 1b via an inside connecting opening 2c.

An axially relocatable, cylindrical ring-like slide part 5 is received radially outside in a sealing manner in a cylindrical third seat 2b designed in the upper part of the connecting opening 2c, which is formed there by a ring-like first recess 2d (FIGS. 1, 1b), and the slide part 5 forms radially inside a cylindrical first seat 5e, which runs coaxially to the connecting opening 2c, in a passage hole 5i (see FIG. 3) connected with the connecting opening 2c in a fluid-penetrable manner. The outside sealing of the slide part 5 takes place via a radially acting, third seal 8 (seal in so-called gliding engagement) arranged in it.

The overhead, first closing element 3 (active or independently driven closing element) designed as a slide piston is received in a sealing manner in the closed position of the double-seat valve 1 in the first seat 5e. For this, a first seal 6 is provided in the first closing element 3, which works exclusively with the first seat 5e through radial pretensioning (radial seal in gliding engagement). The low-lying, second closing element 4 (passive or dependently driven closing element)

also designed as a slide piston works in the closed position of the double-seat valve 1 together with a second seat 2a, which is implemented cylindrically and designed in the bottom part of the connecting opening 2c. The sealing takes place via a second seal 7 arranged in the second closing element 4, which seals radially with respect to the second seat 2a (seal in so-called gliding engagement).

The two closing elements 3, 4 amongst themselves also form in the represented closed as well as open position (FIGS. 1, 3) a leakage cavity 9, which is connected with the surroundings of the double-seat valve 1 via a drainage hole 4d, which penetrates centrically a tubular shaft 4b/4c arranged below on the second closing element 4. The tubular shaft 4b/4c is formed by a connection part 4b connecting to the second closing element 4 and a second pressure compensation piston 4c continuing on the latter.

It is provided in the case of double-seat valve 1 according to the invention to relocate the mechanically necessary joints between the second closing element 4 and the second displacement rod 4a in the form of three traverses 4e evenly distributed over the periphery, which penetrate the drainage hole 4d in a star-shaped manner and in the radial direction, slightly removed from the leakage cavity 9, preferably towards the end of the second pressure compensation piston 4c facing away from the second closing element 4. The permanent connection with the latter takes place via a circumferential ring 4g, with which the traverses 4e are permanently connected on the outside. The traverses 4e, the ring 4g and an displacement rod section 4a* are advantageously combined in a one-piece weld attachment part 40. Negative impacts on the flow rates and the flow pattern in the leakage cavity 9 are avoided through this arrangement.

The second seat 2a has a diameter that is smaller than the diameter of the third seat 2b arranged outside the slide part 5, wherein a transition surface 2e is provided between the second and the third seat 2a, 2b (FIG. 1b).

The first closing element 3 being received in a sealing manner in its closed position in the first seat 5e becomes attached in a sealing manner in the course of its opening movement (FIG. 3) to the second closing element 4 and also transfers the latter into an open position H during the further opening movement. The first closing element 3 has the first seal 6 on a first end section 3, which seals radially in the first seat 5e. The second closing element 4 has a recess 4f on its end facing the first closing element 3 with a mainly cylindrical circumferential wall 4h (FIGS. 1a, 1b) flush with the first seat 5e, wherein the recess 4f is dimensioned in order to receive in a sealing manner the first end section 3** and the radial first seal 6 of the first closing element 3 during the opening movement, before the second closing element 4** opens.

Figure 2:
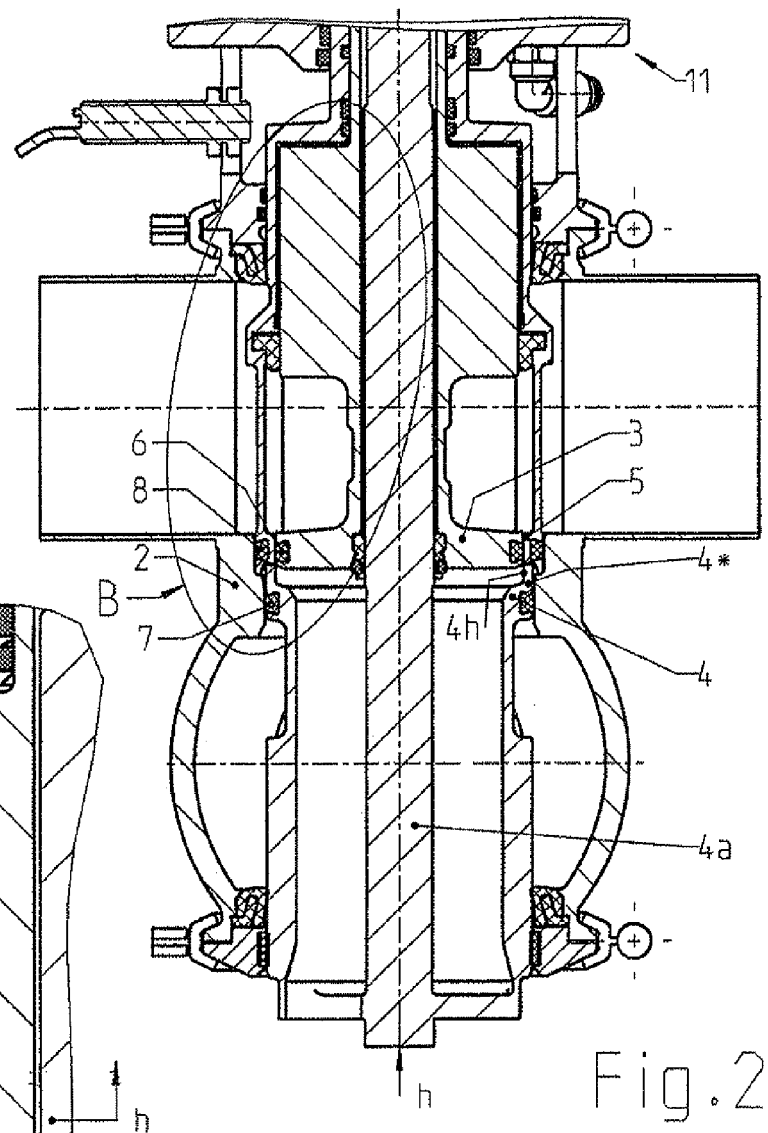
FIG. 2 in a longitudinal and meridian section, the seat cleaning-capable double-seat valve according to FIG. 1, wherein the double-seat valve is located in a so-called pickup position of the low-lying, second closing element.
Figure 2A:
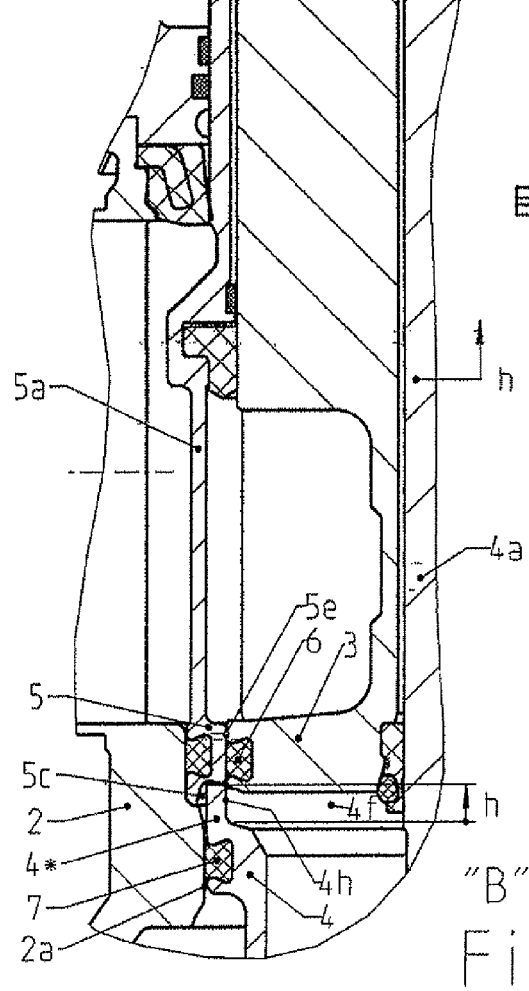
FIG. 2a in an enlarged representation, a longitudinal and meridian section in the seat area and the adjacent upper area according to a detail labeled with "B" in FIG. 2.

The double-seat valve 1 according to the invention has another special feature, which has not been standard in the state of the art until now. It concerns the so-called pickup position of the second closing element 4, before the independently driven first closing element 3 begins its opening movement with the goal of transferring the double-seat valve 1 from its closed to the full open position H. For this purpose (FIGS. 2 and 2a), the second closing element 4, against its later opening movement, is led to the slide part 5 around a pickup lift h with the front surface of a cylindrical second appendage 4* and is installed there, directly adjacent to the first seat 5e. An annular second recess 5c in the slide part 5 (also see FIG. 1b) corresponds with the contact area of the second appendage 4* so that the second appendage 4* is inserted into the second recess 5c in the course of the pickup movement and is installed there on the radial inside end of the second recess 5c, the last section of a contour K of a deflection surface 5b. The first closing element 3 can now enter its first seal 6, without having to bridge an axial, circumferential gap, directly into the circumferential wall 4h flush with the first seat 5e and thus into the recess 4f in the second closing element 4.

The double-seat valve 1 has seat cleaning positions for the closing elements 3, 4 and the slide part 5 for the purpose of the rinsing of its coaxial seats 5e, 2a, 2b, wherein the second closing element 4 can be transferred into its respective seat cleaning position through a second partial lift T2 (FIGS. 4, 4a) directed the same as the opening movement and the slide part 5 through a first partial lift T1 (FIGS. 5, 5a) directed opposite the opening movement. The cylindrical second appendage 4* provided on the leakage cavity side on the closing element 4 is equipped on the outside with a second diameter d2 (FIG. 1b), which forms an annular, second choke gap D2 after execution of the second partial lift T2 with the associated, second seat 2a, through which a second seat cleaning flow R2 is definitively restricted. On the first closing element 3, a cylindrical first appendage 3* measured with an outside first diameter d1 is arranged facing away from the leakage cavity (FIGS. 5a, 1b), which forms an annular first choke gap D1 after execution of the first partial lift T1 with the associated first seat 5e, through which a first seat cleaning flow R1 is restricted in a defined manner. On the slide part 5, a cylindrical third appendage 5* measured with an outside third diameter d3 is arranged on the leakage cavity side (FIGS. 5a, 1b), which forms an annular third choke gap D3 after execution of the first partial lift T1 with the associated third seat 2b, through which a third seat cleaning flow R3 is restricted in a defined manner.

The half diameter difference between the annular first recess 2d and the second seat 2a (FIG. 1b) is characterized with a radial width a. In this radial extension area a, the transition surface 2e is provided between the second seat 2a and the annular first recess 2d, wherein the end section of the transition surface 2e opening into the second seat 2a with the cylindrical shell surface of the annular first recess 2d forms a preferably perpendicular first deflection angle $\alpha$. The annular first recess 2d thereby has a rounded transition to the transition surface 2e designed with a corner radius r1, wherein the corner radius r1 is preferably executed with r1<a. The radial width a is designed large enough that the third seat cleaning flow R3 (FIGS. 5, 5a) in the seat cleaning position of the slide part 5 and thus also of the first closing element 3 discharged from the third choke gap D3 into the leakage cavity 9 on the transition surface 2e is deflected towards the center of the leakage cavity 9 and safely beyond the second closing element 4. In order to ensure that the third seat cleaning flow R3 is not prematurely deflected in the direction of the second closing element 4, a first circumferential edge U1 (FIG. 1b) formed by the transition surface 2e and a first end section 2g of the second seat 2b is rounded with the smallest possible first corner rounding r2, whereby a defined flow break point is established at this spot.

The first seat cleaning flow R1 discharged from the first choke gap D1 is positioned from the very beginning on one hand through the position of the first choke gap D1 and on the other hand for the third seat cleaning flow R3 such that the two seat cleaning flows R1, R3 are not directed at the seat area of the second seal 7. Moreover, the radial width a of the transition surface 2e must also ensure the realization of a valve-housing-side stop surface 2e* (FIGS. 1b, 5a) for the slide part 5 so that a permanent (metallic) stop of the slide part 5 directly neighboring the leakage cavity 9 can be realized on the first seat ring 2. The valve-housing-side stop surface 2e* corresponds with a stop surface 5*d* (FIG. 1*b*) provided on the front side of the cylindrical third appendage 5*, which, seen from the radial direction, has a width b. The valve-housing-side stop surface 2*e* and the pusher-part-side stop surface 5*d* are both preferably straight; the corner radius r1 of the transition surface 2*e* preferably connects tangentially to the stop surface 2*e**.

In the front side of the slide part 5 facing the leakage cavity 9, the annular second recess 5*c* is arranged in the form of the deflection surface 5*b* (FIGS. 1*a*, 1*b*). In an advantageous embodiment, the contour K of this deflection surface 5*b*, seen in the meridian section, has a kink-free progression, and it begins radially outside with a first section of the preferably rotation-symmetrically designed deflection surface 5*b* (starting point of the contour K) and it flows radially inside with a last section under a sharp third deflection angle β into the cylindrical periphery of the first seat 5*e* (opening point of contour K). The transition between the last section of the deflection surface 5*b* and the first seat 5*e* is rounded with a third corner rounding r4, which forms an opening slope for the first seal 6 of the first closing element 3 into the first seat 5*e* on the slide part 5. The deflection surface 5*b* and the stop surface 5*d* form a second circumferential edge U2, which is rounded with a second corner rounding r3. The latter should be designed as small as practically possible from the point of view of stability and production in order to avoid dynamic-pressure-forming effects.

The second circumferential edge U2 in the closed position of the slide part 5 (FIGS. 1 through 4*a*) directly borders the first end section 2*g* of the second seat 2*a*. The kink-free progression of the contour K is advantageously made up of several sections and the directional vector in the end point of the last section points towards the discharge bore hole 4*d* arranged in the second closing element 4 without colliding in a dynamic-pressure-creating manner with the second closing element 4 in the area of its areas bordering the leakage cavity 9. A front-side restriction of the second appendage 4* facing the leakage cavity 9 has an axial safety distance x from the directional vector to an outlet point of the transition surface 2*e* into the first end section 2*g*, which is designed as the initially mentioned first circumferential edge U1 (FIG. 1*b*).

It becomes clear in the open position of the double-seat valve (FIG. 3), when a full opening lift H is realized, that the first closing element 3 radially sealed in the circumferential wall 4*h* via its first seal 6 ensures a secure sealing of the two closing elements 3, 4 between the interior of the valve housing 10 on one side and the leakage cavity 9 on the other side.

FIG. 1*b* further clarifies that the first section of the contour K of the deflection surface 5*b* directly adjacent to the second circumferential edge U2 is flush with the first end section 2*g*. The first end section 2*g* can thereby be designed as a conical section (first opening slope) with exclusively bent or bent and straight contour elements, which connects to the second seat 2*a* with a rounding radius and opens towards the slide part 5. The first end section 2*g* is inclined by a pitch δ with respect to the second seat 2*a*. The pitch δ is 0 to 15 degrees, preferably 5 to 15 degrees and here most preferably δ=15 degrees.

Another optimization of the first end section 2*g* in the form of further improved opening slopes is characterized in accordance with FIG. 1*b* in that the first end section 2*g* is formed by two merging conical shell surfaces rounded with a non-indicated rounding radius.

The second seat cleaning flow R2 discharged from the second choke gap D2 (FIGS. 4 and 4*a*) in the course of the seat cleaning of the second closing element 4 after execution of the second partial lift T2 first flows perpendicular along the second seat 2*a*, follows the progression of the first end section 2*g* without displacing and enters shock-free the deflection surface 5*b*, which is formed by the second recess 5*c*, is deflected there according to contour K, exits the last section of the contour K with the third deflection angle β (FIG. 1*b*) measured against the first seat 5*e*, connects mainly tangentially to a correspondingly slanted front surface 3*b* of the first end section 3** (FIG. 1*b*) and finally makes its way into the area of the discharge bore hole 4*d*.

It is entirely possible to not let the first section of the contour K beginning at the second circumferential edge U2 be flush with the first end section 2*g*. A positioning of the first section around a second deflection angle ε is possible (FIG. 1*b*) when the latter remains outside of 15 degrees. Otherwise, dynamic pressure forms in the area of the second circumferential edge U2. In the case of positioning in the other direction, deflection occurs when the named angle value is exceeded.

If the first end section 2*g* is not designed as an opening slope but rather follows the progression of the second seat 2*a* and is designed cylindrically up to its end (FIG. 1*b*), the first section of the contour K of the deflection surface 5*b* can in turn be designed flush with the first end section 2*g* or the first section can also be inclined by the aforesaid second deflection angle ε<15 degrees with respect to the first end section 2*g*.

A second end section 5** of the cylindrical third appendage 5* of the slide part 5 (FIG. 1*b*) has an annular circumferential chamfer 5*h* on the front side and radially outside subsequent to the stop surface 5*d*, which runs against the stop surface 5*d* under a chamfer angle λ. The circumferential penetration area formed by the chamfer 5*h* and the shell surface of the third appendage 5* on the third diameter d3 is designed in the form of a rounded third circumferential edge U3. The chamfer angle λ is measured such that the third circumferential edge U3, seen in the radial direction, is relocated outward as far as possible and is led as close as permissible to the progression of the transition surface 2*e* determined by the corner radius r1 and forms there with the latter an annular circumferential centering point Z. The slide part 5 is thereby sufficiently coaxially centered shortly before entry into its stop position in each case such that the first and the second circumferential edge U1, U2 correspond with each other in the necessary manner, even if an unplanned chamfer of the slide part 5 takes place due to inadequate guidance at the guide points provided for this according to the plan.

The leakage-space-side end of the third choke gap D3 noted in FIG. 5*a* is mainly sealed closed (inasmuch as generally possible in the case of an metal on metal or solid on solid arrangement) by the stop position (see FIGS. 1*b* and 4*a*) described above of the slide part 5 on the valve-housing-side stop surface 2*e**. Cleaning fluid of the second seat cleaning flow R2 (FIG. 4*a*) can no longer enter the third choke gap D3 and thus the area of the third seal 8. Thus, passage for cleaning fluid is no longer given even in the case of a heavily damaged or entirely removed third seal 8, if applicable.

Figure 5:
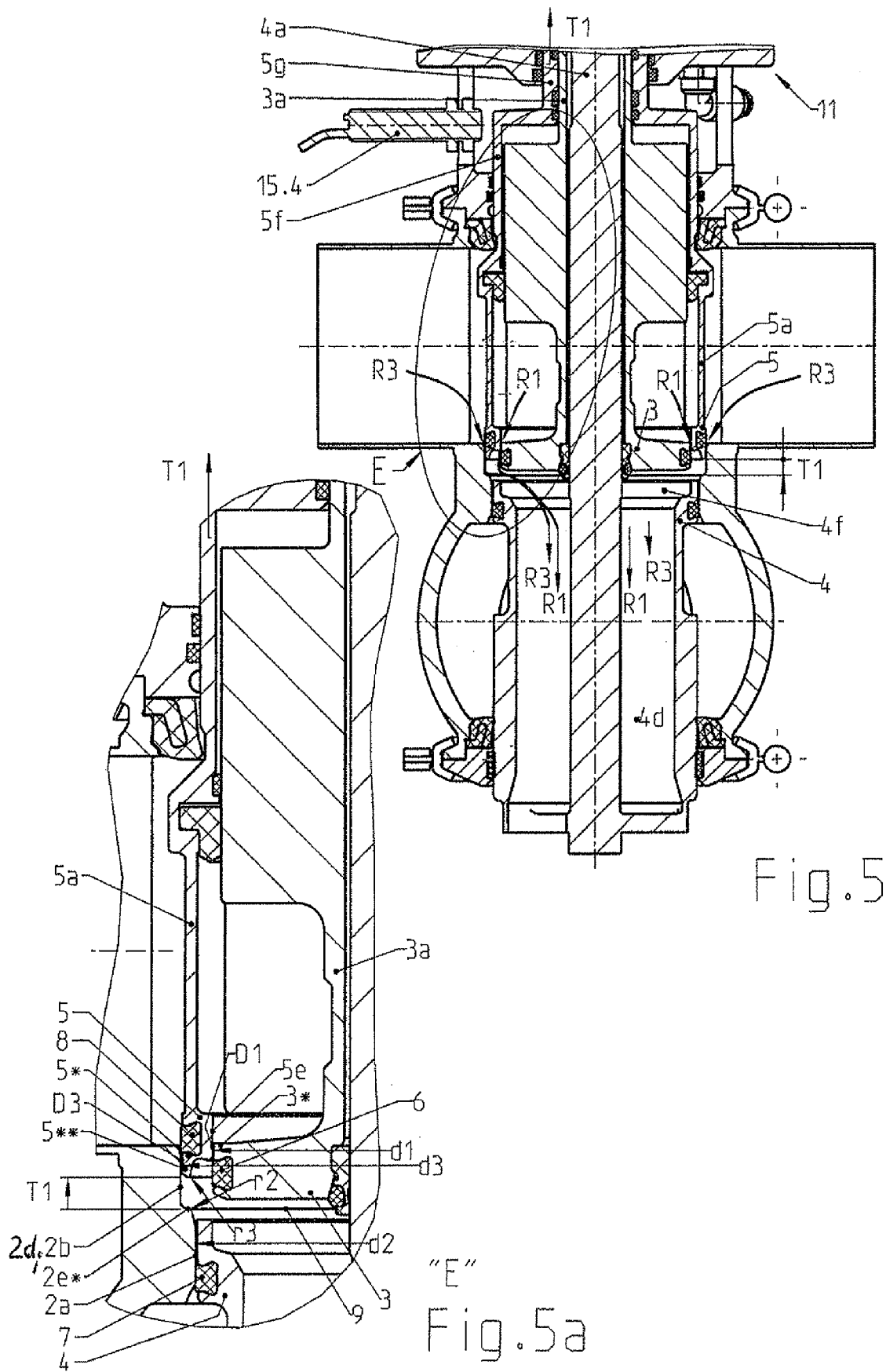
FIG. 5 in a longitudinal and meridian section, the seat cleaning-capable double-seat valve according to FIG. 1, wherein the double-seat valve is located in its seat cleaning position for the overhead, first closing element and FIG. 5a in an enlarged representation, a longitudinal and meridian section in the seat area and the adjacent upper area according to a detail labeled with "E" in FIG. 5.

In accordance with FIGS. 5 and 5*a*, the double-seat valve 1 takes its first seat cleaning position after execution of the upward-directed first partial lift T1 by the slide part 5. The first choke gap D1 is formed on one side between the slide part 5 (first seat 5*e*) and the first closing element 3 (cylindrical first appendage 3*) and other the other side between the slide part 5 (cylindrical third appendage 5*) and the third seat 2*b* of the third choke gap D3. The first seal 6 and the third seal 8 are thereby both removed by a gap's width from their associated seat 5*e* or respectively 2*b*. The first seat cleaning flow R1 passes through the first choke gap D1, flows tangentially past the first seal 6 and makes its way into the leakage cavity 9 and from there en route via the recess 4*f* into the drainage hole 4*d*.

It is further clarified in FIG. 1a that the third seat 2b also has an opening slope 2h that is gentle on the seal for the third seal 8 when the slide part 5 returns to its closed position from its seat cleaning position. The third seat cleaning flow R3 leaves the third choke gap D3 (FIG. 5a) first along the annular first recess 2d and thus also the third seat 2b and is deflected over the transition surface 2e towards the center of the leakage cavity 9. An immediate and direct sprinkling of the seat area of the second seal 7 is thereby securely prevented. The second closing element 4 is positioned axially in the seat cleaning position of the slide part 5 such that the third seat cleaning flow R3 flows unhindered past the second closing element 4 and can make its way into the drainage hole 4d. Through this flow guidance and positioning of the second closing element 4, a suction of the seat area of the second seal 7 is even reached, so that no cleaning agent can enter the neighboring second valve housing part 1b even in the case of failure or significant damage to the second seal 7.

Depending on the given pressure conditions and under the influence of gravity in the arrangement of the double-seat valve 1 according to the drawing position, the liquid jet of the third seat cleaning flow R3 takes a slightly parabolic progression with radial flow components inward, wherein the first seat cleaning flow R1 quasi stacks onto the third seat cleaning flow R3 from above and thus also receives a radial flow component inward. A direct pressurization of the second seat 2a and the second seal 7 assigned to it is thereby securely avoided in the closed position of the second closing element 4 even through the first seal cleaning flow R1.

FIG. 1 shows the one-piece weld attachment part 40, which is formed from the displacement rod section 4a*, the three traverses 4e and the ring 4g. The for example three traverses 4e arranged evenly distributed over the periphery of the displacement rod section 4a* are permanently connected with it. They are all also permanently connected radially outside with the circumferential ring 4g. The weld attachment part 40 is welded outside onto the second pressure compensation piston 4c bordering the section of the drainage hole 4d removed from the hollow space via the ring 4g and inside on the first displacement rod 4a via the displacement rod section 4a*. The inner diameter of the ring 4g is thereby enlarged with respect to the diameter of the drainage hole 4d under interconnection of a conically expanding transition area such that the inner passage of the drainage hole 4d is not narrowed by the traverses 4e.

The double-seat valve 1 according to the invention has a drive 11, which is arranged above the first valve housing part 1a and connected with the latter by means of a lantern (not shown). This drive 11, which is not an object of the present invention, fulfills all requirements of the movement kinematics of the closing elements 3, 4 described above and of the slide part 5 for the execution of the opening and closing movement and the two seat cleaning movements of the double-seat valve 1. This is performed by the aforementioned first displacement rod 3a for the first closing element 3, the second displacement rod 4a for the second closing element 4 and a third displacement rod 5g for the slide part 5 (FIG. 1).

One suggestion provides that the slide part 5 is connected with a cup-shaped receiving cylinder 5f open towards the slide part 5 via fluid-permeable connecting bars 5a, which penetrates the associated first valve housing part 1a in a relocatable manner and in a sealing manner via a second housing seal 13 and continues into the third displacement rod 5g, which is inserted into the drive 11, on its end facing away from the slide part 5.

Starting with the above arrangement, another suggestion provides that the first displacement rod 3a connected with the first closing element 3, designed as a hollow rod and also inserted into the drive 11 penetrates the receiving cylinder 5f in a relocatable, concentric manner, is sealed against it via a cylinder seal 14 at its inlet point into the receiving cylinder 5f and is designed as a first pressure compensation piston 3a* in the contact area with the receiving cylinder 5f, the outer diameter of which reaches all the way up to the outer diameter of the first closing element 3 in the borderline case.

The second displacement rod 4a connected with the second closing element 4 penetrates concentrically the first displacement rod 3a designed as a hollow rod and is inserted into the drive 11. On the end of the second displacement rod 4a lying opposite the drive 11, the latter is preferably connected with the tubular shaft 4b/4c shaped on the second closing element 4 via the weld attachment part 40. The latter is designed in the form of the second pressure compensation piston 4c penetrating in a sealing manner the associated second valve housing part 1b via a first housing seal 12, the outer diameter of which reached all the way up to the outer diameter of the second closing element 4 in the borderline case. Due to the characteristics of the double-seat valve 1 according to the invention, the drainage hole 4d penetrating the second pressure compensation piston 4c can thereby be measured such that its passage cross-section is equal to the passage cross-section of the largest pipeline connected to the valve housing parts 1a, 1b.

An underlying second embodiment of the double-seat valve 1 according to the invention is characterized in that there is now a fixed cylindrical second seat ring 50 in place of the axially relocatable, cylindrical, annular slide part 5 (FIG. 1). The embodiment with respect to this is not shown in FIG. 1, but rather only the reference numbers of the two modified components 50, 50a are specified at the locations in question. The second seat ring 50 is supposed in an unrelocatable manner via at least one modified connecting bar 50a in the first valve housing part 1a, and namely on its side lying opposite the second seat ring 2. A seat ring supported in this respect is generally known from EP 0 646 741 A1. Since the second seat ring 50 is axially unrelocatable, the seat cleaning of the first closing element 3 now takes place such that the first closing element 3 is transferrable to its seat cleaning position through a first partial lift T1 directed opposite the opening movement. The first seat cleaning in this respect now only generates a first seat cleaning flow R1 via a sole first choke gap D1 on the first closing element 3. The latter is definitively measured via the first choke gap D1, which is formed between a cylindrical first appendage 3 (corresponds with the first end section 3 in the model with slide part 5) arranged on the leakage cavity side on the first closing element 3 and the associated first seat 5e.

In a control head (not shown and not labeled), which is arranged on the side of the drive 11 facing away from the double-seat valve 1, a first and a second position detector 15.1, 15.2 are arranged in the first embodiment of the double-seat valve 1 for the detection of the closing and opening position and a third position detector 15.3, with which the second partial lift T2 of the second closing element 4 is detected. The position of the slide part 5 is captured via a fourth position detector 15.4, which detects the receiving cylinder 5f connected with the slide part 5, led out of the first valve housing part 1a and arranged between the first valve housing part 1a and the drive 11. In the case of the second embodiment of the double-seat valve 1, there is no detection of the slide part 5 and a fifth position detector 15.5 working together with the first valve rod 3a is provided in the control head for capturing the first partial lift T1 of the first seat cleaning position.

It is understandable from the above that different modifications and variants can be realized without deviating from the spirit and new concept of the present invention. This is to be understood in that no restriction of one of the two underlying embodiments is intended, which are represented and described here or were only described. The disclosure should incorporate all such modifications located within the protective scope claimed by the claims.

This completes the description of the preferred and alternate embodiments of the invention. Those skilled in the art may recognize other equivalents to the specific embodiment described herein which equivalents are intended to be encompassed by the claims attached hereto.

REFERENCE LIST OF ABBREVIATIONS 1 double-seat valve
10 valve housing
1a first valve housing part
1b second valve housing part
2 first seat ring
2a second seat (cylindrical seat)
2b third seat (cylindrical seat)
2c connecting opening
2d annular first recess
2e transition surface
2e* valve-housing-side stop surface
2g first end section (first opening slope)
2h second opening slope
3 first closing element (first slide piston)
3* cylindrical first appendage
3** first end section (for cylindrical first appendage of the second embodiment)
3a first displacement rod
3a* first pressure compensation piston
3b front face
4 second closing element (second slide piston)
4* cylindrical second appendage
4a second displacement rod
4b/4c tubular shaft
4b connecting part
4c second pressure compensation piston
4d drainage hole
4f recess
4h (cylindrical) circumferential wall
40 weld attachment part
4a* displacement rod section
4e traverse
4g ring
5 annular slide part
5* cylindrical third appendage
5** second end section
5a connecting bar
5b deflection surface
5c annular second recess
5d stop surface (slide-side)
5e first seat (cylindrical seat)
5f receiving cylinder
5g third displacement rod
5h chamfer
5i passage hole
50 second seat ring
50a modified connecting bar
6 first seal (radial)
7 second seal (radial)
8 third seal (radial)
9 leakage cavity
10 (valve housing)
11 drive
12 first housing seal
13 second housing seal
14 cylinder seal
15.1 first position detector
15.2 second position detector
15.3 third position detector
15.4 fourth position detector
15.5 fifth position detector
a radial width of the transition surface 2e
b width (slide-side stop surface on the second end section 5**)
d1 first diameter (first closing element 3)
d2 second diameter (second closing element 4)
d3 third diameter (slide part 5)
h pickup lift
r1 rounding radius (of the transition surface 2e)
r2 first edge rounding (valve-housing-side stop surface 2e* with first end section 2g)
r3 second edge rounding (stop surface 5d with first section of the deflection
surface 5b)
r4 third edge rounding (deflection surface 5b with first seat 5e)
x axial safety distance
α first deflection angle (on the transition surface 2e)
β third deflection angle (outlet of the deflection surface 5b with the first seat 5e)
δ pitch (of the first end section 2g)
ε second deflection angle (between a first end section 2g and first section of
the deflection surface 5b)
λ chamfer angle (between stop surface 5d and chamfer 5h)
D1 first choke gap (on the first closing element 3)
D2 second choke gap (on the second closing element 4)
D3 third choke gap (on the slide part 5)
H complete opening lift (fully opening position)
K contour of the deflection surface 5b
R1 first seat cleaning flow (on the first closing element 3)
R2 second seat cleaning flow (on the second closing element 4)
R3 third seat cleaning flow (on the slide part 5)
T1 first partial lift (first partially open position/first seat cleaning position)
T2 second partial lift (second partially open position/second seat cleaning position)
U1 first circumferential edge (valve-housing-side stop surface 2e* with first end section 2g)
U2 second circumferential edge (stop surface 5d with first section of the deflection surface 5b)
U3 third circumferential edge (between chamfer 5h and third diameter d3)
Z centering point

The invention claimed is:

1. A double-seat valve with two serially arranged closing elements (3, 4), moveable relative to each other and designed as slide pistons, which prevent in the closed position of the double-seat valve (1) the overflow of fluids from one valve housing part (1a; 1b) into another (1b; 1a) through a connecting opening (2c) connecting the valve housing parts (1a, 1b) with each other and which border both in the closed and open position of the double seat valve (1) a leakage cavity (9), which is connected with the double-seat valve (1) via a tubular shaft (4b/4c) arranged on a second closing element (4), in which a drainage hole (4d) is arranged, wherein an axially relocatable, cylindrical annular slide part (5) both in the closed as well as open position of the double-seat valve (1) is received in a sealing manner radially outward in a cylindrical third seat (2b), which is formed in a connecting opening (2c) connecting the valve housing parts together, and forms radially inward in a passage hole (5i) connected in a fluid-penetrable manner with the connecting opening (2c) a cylindrical first seat (5e), which runs coaxially to the connecting opening (2c), wherein in the closed position a first closing element (3) is received in a sealing manner in the first seat (5e), and in the course of its opening movement comes into sealing abutment with the second closing element (4), which is associated with a cylindrical second seat (2a) in the connecting opening (2c), and in a further opening movement the second closing element (4) is also transferred into an open position (H), wherein the first closing element (3) on a first end section (3) has a first seal (6), which radially seals in the first seat (5e), wherein the second closing element (4) on its end facing the first closing element (3) has a recess (4f) with a mainly cylindrical circumferential wall (4h) that is flush with the first seat (5e) and the recess (4f) is dimensioned to receive in a sealing manner the first end section (3) and a radial first seal (6) of the first closing element (3) during the opening movement before the second closing element (4) opens, each with a seat cleaning position for the closing elements (3, 4) and the slide part (5) for the purpose of rinsing their coaxial seats (5e, 2a, 2b), wherein the second closing element (4) through a second partial lift (T2) directed the same as the opening movement and the slide part (5) through a first partial lift (T1) directed opposite the opening movement are transferrable to their respective seat cleaning position, wherein the second seat (2a) has a diameter that is smaller than the diameter of the third seat (2b) associated with the slide part (5), wherein a transition surface (2e) is provided between the second and the third seats (2a, 2b) and wherein an annular, second recess (5c) includes a deflection surface (5b) is arranged in the front face of the slide part (5) facing the leakage cavity (9).

2. The double-seat valve according to claim 1, wherein a cylindrical first appendage (3*) is arranged on the first closing element (3) facing away from the leakage cavity, which forms an annular first choke gap (D1) with the associated first seat (5e) after execution of the first partial lift (T1).

3. The double-seat valve according to claim 1 wherein a cylindrical third appendage (5*) is arranged on the slide part (5) on a leakage cavity side, which form an annular third choke gap (D3) with the associated third seat (2b) after execution of the first partial lift (T1).

4. The double-seat valve according to claim 1, wherein a cylindrical second appendage (4*) is provided on the second closing element (4) on a leakage cavity side, which forms an annular second choke gap (D2) with the associated second seat (2a) after execution of the second partial lift (T2).

5. The double-seat valve according to claim 1, wherein the second closing element (4) is led with its front face to the slide part (5) by a pickup lift (h) directed opposite the opening movement, in terms of time, right before the opening movement of the first closing element (3) and comes to rest directly adjacent to the first seat (5e).

6. The double-seat valve according to claim 1, wherein the tubular shaft (4b/4c) in its area penetrating the associated second valve housing part (1b) is designed as a second pressure compensation piston (4c), the outer diameter of which reaches up to the outer diameter of the second closing element (4) in the borderline case.

7. The double-seat valve according to claim 1, wherein the passage cross-section of the drainage hole (4d) is equal to the passage cross-section of a largest pipeline connected to the valve housing parts (1a, 1b).

8. The double-seat valve according to claim 1, wherein the slide part (5) is connected with a cup-shaped receiving cylinder (5f) open towards the slide part (5) via fluid-penetrable connecting bars (5a), which penetrates the associated first valve housing part (1a) in a relocatable and sealing manner and continues on its end facing away from the slide part (5) in a third displacement rod (5g) executed as a hollow rod, which is inserted into a drive (11).

9. The double-seat valve according to claim 8, wherein a first displacement rod (3a) connected with the first closing element (3), designed as a hollow rod and inserted into the drive (11) penetrates the receiving cylinder (5f) in a relocatable, concentric manner, is sealed against the receiving cylinder (5f) at its inlet point and is designed as a first pressure compensation piston (3a*) in the contact area with the receiving cylinder (5f), the outer diameter of which reached up to the outer diameter of the first closing element (3) in a borderline case.

10. The double-seat valve according to claim 9, wherein a second displacement rod (4a) connected with the second closing element (4) penetrates concentrically the first displacement rod (3a) designed as a hollow rod and is inserted into the drive (11).

11. The double-seat valve according to claim 1, wherein the slide part (5) in its closed position with a stop surface (5d) arranged on its front face abuts against the transition surface (2e), and namely directly adjacent to the second seat (2g; 2a); in the further progression of the front face of a third appendage (5*), the annular second recess (5c) is provided, a contour (K) of which, seen in the meridian section, has a kink-free progression, begins radially outward with a first section of the rotation-symmetrical deflection surface (5b) and opens radially inward with a last section under a sharp third deflection angle (β) into the cylindrical boundary surface of the first seat (5e); the deflection surface (5b) and the stop surface (5d) form a second circumferential edge (U2), which directly borders a first end section (2g) of the second seat (2a) in the closed position of the slide part (5), and a directional vector in the opening point of the deflection surface (5b) points into a drainage hole (4d) that is centrally arranged in the second closing element (4), without colliding with the first or the second closing element (3, 4) in the region of its areas bounding the leakage cavity (9); and a front side boundary of the second closing element (4), facing the leakage cavity (9), has an axial safety distance (x) from the directional vector at an outlet point of the transition surface (2e), formed as a first circumferential edge (U1) into the first end section (2g).

12. The double-seat valve according to claim 1, wherein the third seat (2b) with the transition surface (2e) forms a blunt or a perpendicular first deflection angle (α) (α≥90 degrees).

13. The double-seat valve according to claim 1, wherein the third seat (2b) has a rounded transition to the transition surface (2e) designed with a rounding radius (r1).

14. The double-seat valve according to claim 10, wherein the second displacement rod (4a) passes through the leakage hole (4d) and is permanently connected with the second closing element (4) via at least one mainly radially oriented traverse (4e) on an end of the second closing element (4) facing away from the first closing element (3).

15. The double-seat valve according to claim 11, wherein a second end section (5**) of the slide part (5) has radially outside in the connection to the stop surface (5d) an annular circumferential chamfer (5h), which runs against the stop surface (5d) under a chamfer angle (λ), which is measured such that a third circumferential edge (U3) formed between the chamfer (5h) and a third diameter (d3) of the slide part (5) through rounding, seen in the radial direction, is relocated as far as possible outside and as close as permissible to the progression of the transition surface (2e) determined by the rounding radius (r 1) and forms there an annular circumferential centering point (Z).

16. The double-seat valve according to claim 1, wherein the closed and open positions of the closing elements (3, 4) are detected via latter actuating displacement rods (3a, 4a) by means of a first or respectively a second position detector (15.1; 15.2), which are arranged in a side of the drive (11) facing away from the double-seat valve (1) in a control head.

17. The double-seat valve according to claim 16, wherein the second partial lift (T2) of the second closing element (4) is detected via the second displacement rod (4a) by means of a third position detector (15.3), which is arranged in the control head.

18. The double-seat valve according to claim 17, wherein the first partial lift (T1) of the slide part (5) is captured via a fourth position detector (15.4), which detects a receiving cylinder (5f) connected with the slide part (5) and led out of the first valve housing part (1a) and is arranged between the first valve housing part (1a) and the drive (11).

19. A double-seat valve with two serially arranged closing elements (3, 4), moveable relative to each other and designed as slide pistons, which prevent in the closed position of the double-seat valve (1) the overflow of fluids from one valve housing part (1a; 1b) into another (1b; 1a) through a connecting opening (2c) connecting the valve housing parts (1a, 1b) with each other and which border both in the closed and open position of the double seat valve (1) a leakage cavity (9), which is connected with the double-seat valve (1) via a tubular shaft (4b/4c) arranged on a second closing element (4), in which a drainage hole (4d) is arranged, wherein a fixed, cylindrical annular second seat ring (50) is provided, which received in a sealing manner radially outside in a cylindrical third seat (2b) designed in the connecting opening (2c), which forms a cylindrical first seat (5e) radially inside in a passage hole (Si) connected in a fluid-penetrable manner with the connecting opening (2c), which runs coaxially to the connecting opening (2c) and is connected with the connecting opening (2c) in a fluid-penetrable manner and which is supported in an unrelocatable manner via at least one modified connecting bar (50a) in the first valve housing part (1a), on its side lying opposite the second seat ring (50), wherein in the closed position a first closing element (3) is received in a sealing manner in the first seat (5e), and in the course of its opening movement comes into sealing abutment with a second closing element (4), which is associated with a cylindrical second seat (2a) designed in the connecting opening (2c), and in a further opening movement the second closing element (4) is also transferred into an open position (H), wherein the first closing element (3) on a first end section (3) has a first seal (6), which radially seals in the first seat (5e), wherein the second closing element (4) on its end facing the first closing element (3) has a recess (4f) with a mainly cylindrical circumferential wall (4h) that is flush with the first seat (5e) and the recess (4f) is dimensioned to receive in a sealing manner the first end section (3) and a radial first seal (6) of the first closing element (3) during the opening movement before the second closing element (4) opens, with closing elements (3, 4), that can independently of each other be transferred gap wide by a partial lift, into a seat cleaning position for the purpose of rinsing their coaxial seats (5e, 2a), wherein the second closing element (4) can be transferred through a second partial lift (T2) in the same direction as the opening movement, and the first closing element (3) through a first partial lift (T1) in the direction opposed to the opening movement, each into their respective seat cleaning position, wherein the second seat (2a) has a diameter that is smaller than the diameter of the third seat (2b) associated with the second seat ring (50), wherein a transition surface (2e) is provided between the second and the third seats (2a, 2b) and wherein an annular, second recess (5c) in the form of a deflection surface (5b) is arranged in the front face of the second seat ring (50) facing the leakage cavity (9).

20. The double-seat valve according to claim 19, wherein a cylindrical appendage (3**, 4*) is arranged on each closing element (3, 4) on a leakage cavity side, which forms an annular choke gap (D1, D2) with the associated seat (5e, 2a).

21. The double-seat valve according to claim 19, wherein the second closing element (4) is led with its front face to the second seat ring (50) by a pickup lift (h) directed opposite the opening movement, in terms of time, right before the opening movement of the first closing element (3) and comes to rest directly adjacent to the first seat (5e).

22. The double-seat valve according to claim 19, wherein the second seat ring (50) with a stop surface (5d) arranged on its front face abuts against the transition surface (2e), and namely directly adjacent to the second seat (2g; 2a); in the further progression of the front face of the second seat ring (50), which protrudes radially inward with respect to the second seat (2a), the annular second recess (5c) is provided, a contour (K) of which, seen in the meridian section, has a kink-free progression, begins radially outward with a first section of the rotation-symmetrical deflection surface (5b) and opens radially inward with a last section under a sharp third deflection angle (β) into the cylindrical boundary surface of the first seat (5e); the deflection surface (5b) and the stop surface (5d) form a second circumferential edge (U2), which directly borders a first end section (2g) of the second seat (2a); seen in the meridian section, a directional vector in the opening point of the deflection surface (5b) points into the drainage hole (4d) that is centrally arranged in the second closing element (4), without colliding in a dynamic pressure creating manner with the first or the second closing element (3, 4) in the region of its areas bounding the leakage cavity (9); and a front side boundary of a second appendage (4*), facing the leakage cavity (9), has an axial safety distance (x) from the directional vector at an outlet point of the transition surface (2e), formed as a first circumferential edge (U1) into the first end section (2g).

* * * * *